Patented Nov. 3, 1936

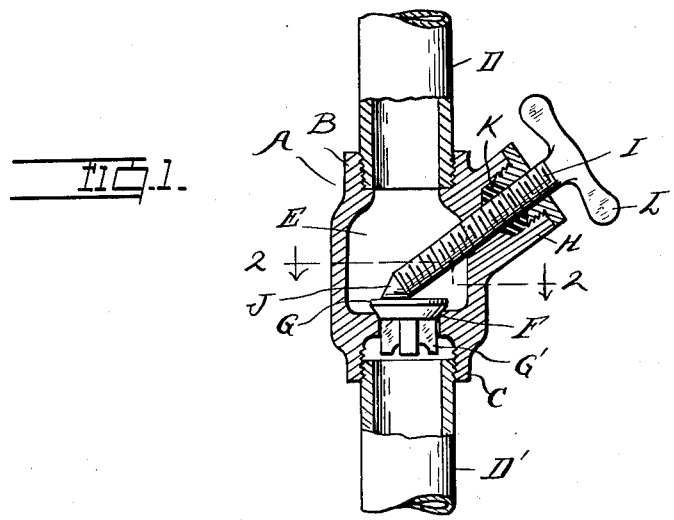
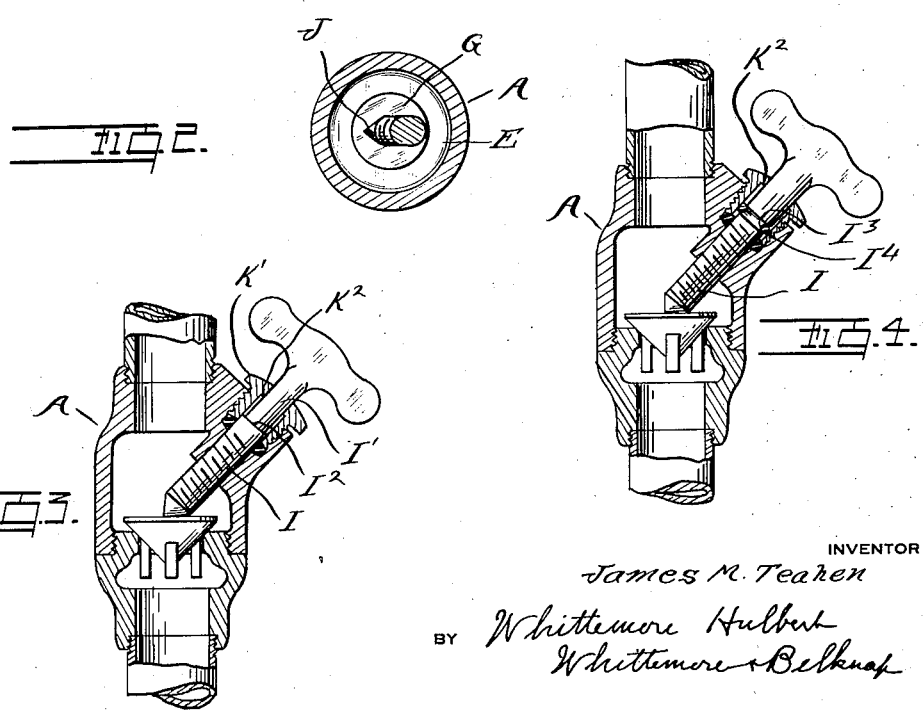
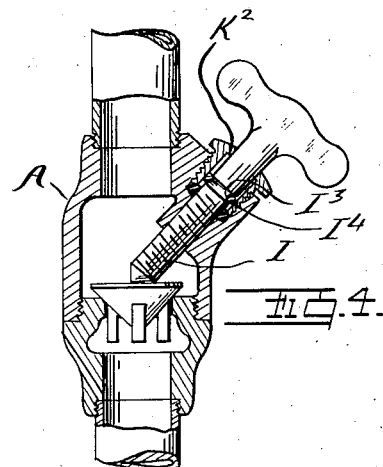

2,059,760

UNITED STATES PATENT OFFICE 2,059,760

FLOW REGULATING CONTROL VALVE FOR PLUMBING FIXTURES

James M. Teahen, Detroit, Mich.

Application February 12, 1934, Serial No. 710,924

1 Claim. (Cl. 251—139)

The invention relates to liquid flow regulators and is more particularly designed for application to plumbing fixtures which are installed in connection with water systems having different hydrostatic pressures. It is the object of the invention to obtain a fitting which can be coupled into the usual water supply conduit and which is adjustable to properly regulate the flow. It is a further object to prevent any backflow or suction from the fixture in case the water is cut off from the supply line. With these objects in view the invention consists in the construction as hereinafter set forth.

In the drawing:

Fig. 1 is a longitudinal section through my improved fitting;

Fig. 2 is a cross section on line 2—2 of Fig. 1;

Figs. 3 and 4 are views similar to a portion of Fig. 1, showing modified means for preventing complete disengagement of the stem.

In the installation of plumbing fixtures and more particularly water closets having flushing tanks and ball cocks, it is desirable to control the rate of flow. There is, however, a very great difference in pressure in water systems in connection with which such fixtures are installed, so that the rate of flow in one differs from that in another. My improved fitting can be readily connected into the water supply line and adjusted to compensate for such differences.

In detail, A is a straight-way fitting having threaded nipples B and C at its opposite ends for connecting in between sections D and D' of the water conduit. This fitting has a central chamber E of enlarged cross section and at the lower end of this a valve seat F. G is a valve having a conical portion for engaging the seat F and depending wings G' for guiding the valve to its seat. H is an obliquely extending nipple interiorly threaded to receive a correspondingly threaded stem I having a conical lower end J for contacting with the top face of the valve. The stem I passes through a packing gland K engaging the nipple H, while at the outer end of the stem is a handle L.

With the construction as described, when the fitting A is connected into the water supply line, the rate of flow of water to the fixture may be regulated by turning the handle L. This will alter the distance between the conical lower end J of the stem and the valve G so as to determine the distance the valve is permitted to lift from its seat. The conical form of the seat and of the contacting portion of the valve will deflect the water uniformly therearound and will determine the amount that will pass in any given time interval. Thus the flow to the fixture can be adjusted to any desired rate. The upright position of the fitting permits the valve to seat by gravity whenever the pressure above is equal to or greater than that below, which in case of suction on the line will prevent back flow through the fitting.

With the construction shown in Fig. 1, it would be possible to completely disengage the stem I by screwing it outward and therefore some inexperienced person might inadvertently open the fitting and cause a flood. To avoid this I preferably provide a stop for limiting the adjustment of the screw which as shown in Fig. 3 is formed by reducing the diameter of the outer portion of the stem as indicated at I', thereby forming a shoulder $I^2$. The packing gland K' is of an internal diameter which will receive a large diameter portion of the stem I but is provided at its outer end with a shoulder $K^2$ counter to the shoulder $I^2$. Thus the stem may be adjusted by rotating the same until the shoulders $I^2$ and $K^2$ come in contact which will prevent further adjustment or detachment of the stem.

In Fig. 4 the construction is similar but instead of making the stem I with portions of different diameter, an annular groove $I^3$ is formed in the stem in which groove a snap ring $I^4$ is inserted. The construction of the packing gland is similar to that shown in Fig. 3, being provided with a shoulder $K^2$ for cooperating with the ring $I^3$ to limit outward movement of the stem.

What I claim as my invention is:

A liquid flow regulator comprising a straight-way fitting having threaded nipples at its opposite ends for connecting into a vertical water supply line and having a central chamber of enlarged cross section, a valve seat at the lower end of said central chamber, a valve having a conical portion for engaging said seat and wing portions for guiding it to its seat, a stem extending obliquely into said fitting from one side thereof and having a threaded engagement therewith, the lower end of said stem being conical and at an angle corresponding to the upper face of said valve, a packing gland for sealing said stem in said fitting and a handle at the outer end of said stem for rotating the same to vary the distance of lift permitted to said valve.

JAMES M. TEAHEN.